(12) United States Patent
Salecker et al.

(10) Patent No.: US 6,470,253 B1
(45) Date of Patent: Oct. 22, 2002

(54) VEHICLE WITH MEMORY FOR STORING PAIRED VALUES, CONSISTING OF FIRST DATA AND THE RUN DISTANCE

(75) Inventors: Michael Salecker, Stuttgart/Sonnenberg (DE); Claudio Castro, Sorocaba (BR); Thilo Reichel, Wilnsdorf (DE)

(73) Assignee: Luk Lamellen und Kupplungsbau Beteiliguaigs KG, Bühl (DE)

( * ) Notice: Subject to any disclaimer, the term of this patent is extended or adjusted under 35 U.S.C. 154(b) by 0 days.

(21) Appl. No.: 09/831,249

(22) PCT Filed: Oct. 28, 1999

(86) PCT No.: PCT/DE99/03491
§ 371 (c)(1),
(2), (4) Date: Oct. 9, 2001

(87) PCT Pub. No.: WO00/28230
PCT Pub. Date: May 18, 2000

(30) Foreign Application Priority Data

Nov. 5, 1998 (DE) .......................................... 198 50 973

(51) Int. Cl.⁷ ............................................. G06F 17/00
(52) U.S. Cl. ............................. 701/67; 701/29; 701/30; 701/35; 180/293; 192/30 R
(58) Field of Search ...................... 701/25, 29, 30, 701/51, 52, 67, 35; 180/293; 192/3.32, 30 R, 31, 32

(56) References Cited

U.S. PATENT DOCUMENTS

| 4,241,403 A | 12/1980 | Schultz ........................ 364/300 |
| 4,601,369 A | * 7/1986 | Hattori et al. ............. 192/3.58 |
| 4,692,882 A | 9/1987 | Skovgaard et al. ......... 364/565 |
| 5,823,912 A | 10/1998 | Fischer et al. ................ 477/97 |

FOREIGN PATENT DOCUMENTS

| DE | 196 02 006 A 1 | 8/1996 |
| DE | 196 39 296 C 1 | 4/1998 |
| FR | 2 593 287 | 7/1987 |

* cited by examiner

*Primary Examiner*—Gertrude Arthur
(74) *Attorney, Agent, or Firm*—Alfred J. Mangels

(57) ABSTRACT

A vehicle including a device for determining vehicle operational data and for determining distance traveled by the vehicle. A memory is provided for storing the operational data together with the distance traveled as paired values for subsequent diagnostic and maintenance purposes. Signals representative of engine rotational speed, transmission input rotational speed, and torque transmitted by the clutch are sensed for determining clutch performance loss values, and the performance loss values are stored in the memory as paired values along with the vehicle distance traveled.

14 Claims, 2 Drawing Sheets

US 6,470,253 B1

VEHICLE WITH MEMORY FOR STORING PAIRED VALUES, CONSISTING OF FIRST DATA AND THE RUN DISTANCE

CROSS REFERENCE TO RELATED APPLICATION

This application is a 371 of PCT/DE99/03491, filed Oct. 28, 1999.

BACKGROUND OF THE INVENTION

1. Field of the Invention

The present invention relates to a motor vehicle with a memory device for storing vehicle operating data. More particularly, the present invention relates to correlating vehicle operating data with distance traveled by the vehicle for diagnostic and maintenance purposes.

2. Description of the Related Art

Vehicles with memories for storing data have become known for example through German Patent Publication No. DE 19639296. For such a vehicle, the energy loss resulting from clutch slippage is added up and stored in a memory device.

This has the disadvantage that the stored data characterize only a snapshot of the condition of the vehicle. During the vehicle's time in a repair shop, for instance, only the current condition can be read from memory.

The purpose of the invention is to provide a vehicle of the above-described kind with improved functionality. Improvements are intended particularly with regard to diagnostics.

SUMMARY OF THE INVENTION

That purpose is accomplished in accordance with the invention with a motor vehicle of the above-described kind by providing a device for determining the distance traveled by the vehicle, and by associating the stored data of the vehicle data with the data of the distance traveled by the vehicle and storing those data together as paired values in a storage unit.

It has proven particularly useful if the vehicle is equipped with at least one driving motor and/or a clutch and/or a transmission. It is also useful if the clutch can be actuated automatically or if, in another embodiment in accordance with the invention, the transmission can be actuated automatically.

Furthermore it can also be beneficial if the clutch is actuated manually or if, in another beneficial embodiment, the transmission is actuated manually.

Is it also advantageous if a device is incorporated, which determines the lost energy resulting from clutch slippage. This can be provided, for example, by determining the energy loss from slippage in an electronic computer unit by integration of the product of the transmittable clutch torque $M_K$ and the clutch slippage $(N_M-N_K)$, where $N_M$ is the engine rotational speed and $N_K$ is the transmission input rotational speed.

In doing so it has proven useful to provide a device that determines the engine rotational speed $N_M$ or another value representing that value. It is also useful to provide a device that determines the transmission input rotational speed $N_K$, or another value representing that value. Furthermore it is beneficial if a device is provided that determines the torque $M_K$ that is transmitted by the clutch, or another value representing that value.

In accordance with the invention it is beneficial if the stored data can be used for the determination of adaptive values. For example, stored information relating to the energy loss or the power loss of the transmission can be used to calculate the wear of the friction linings of a clutch and thereby to adapt the engagement point of the clutch as an adaptive value based on the wear of the clutch linings.

It can also prove beneficial in accordance with the invention to utilize the stored data for failure evaluation and/or failure-warning purposes. For example, storage of the energy loss or the power loss of the transmission can be used to calculate the wear of the friction linings of a clutch and thereby the remaining wear reserve of the clutch, and it can also be used to issue a warning signal that indicates the wear condition when a critical limit value has been reached.

BRIEF DESCRIPTION OF THE DRAWINGS

Embodiments of the invention will be further explained with the help of the drawings, in which.

DESCRIPTION OF THE PREFERRED EMBODIMENTS

Figure 1:
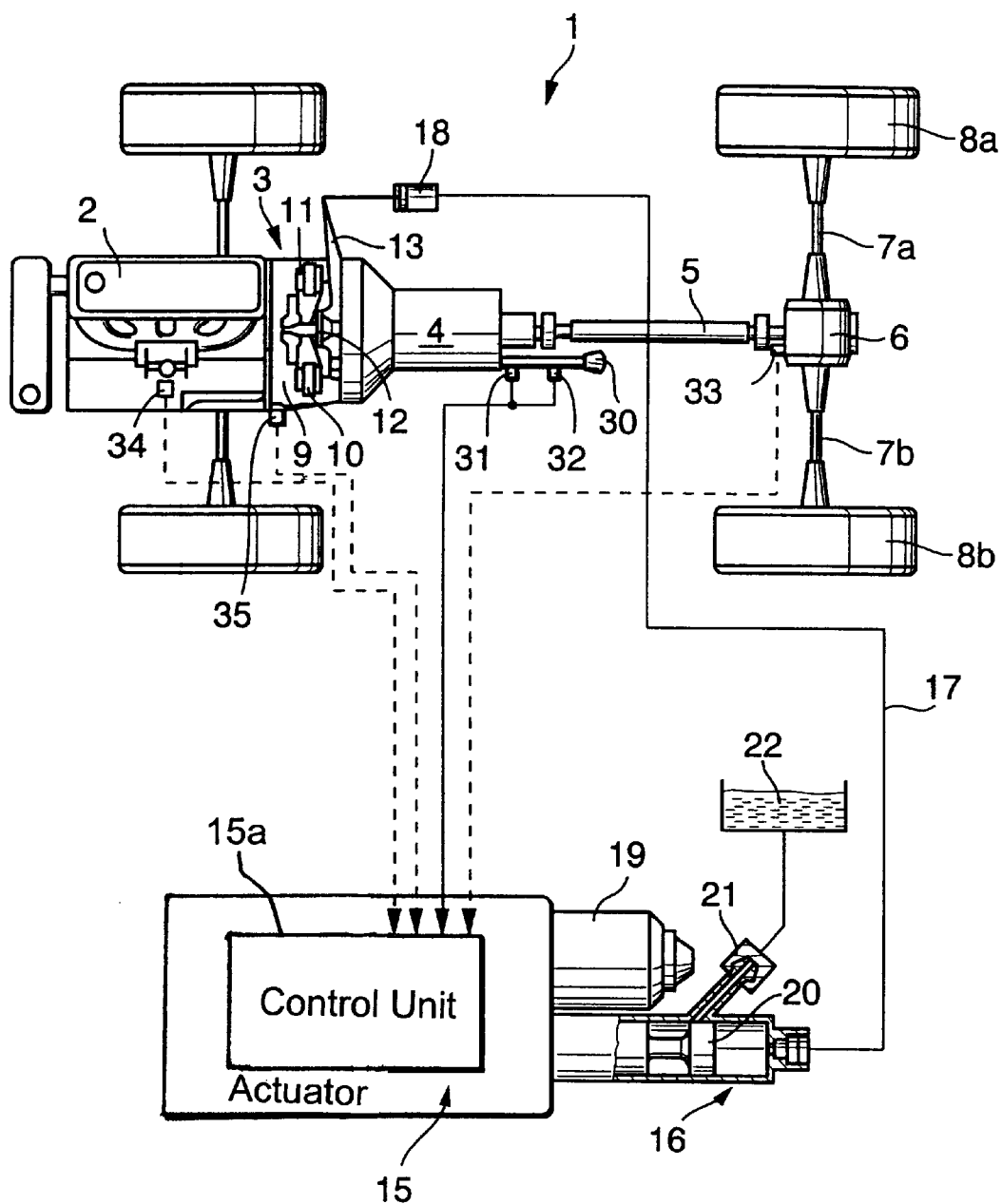
FIG. 1 is a diagrammatic representation of a motor vehicle drive train.

FIG. 1 diagrammatically shows a motor vehicle 1 with a drive unit or engine 2, such as an internal combustion engine or a hybrid drive arrangement with an internal combustion engine and an electric motor. A clutch 3 and a transmission 4 are provided in the drive train and a drive shaft 5 extends from the transmission and which through a differential 6 drives two drive shafts 7a and 7b, which, in turn, drive the driven wheels 8a and 8b. The clutch 3 is shown as a dry, friction clutch with a pressure plate 10, a clutch disk 11, a clutch release bearing 12, and clutch shift fork 13, and is assembled with a flywheel. The clutch shift fork 13 is actuated through an actuator 15 including a master cylinder 16, a pressure-fluid conduit, such as an hydraulic conduit 17, and a slave cylinder 18. The actuator 15 is equipped with a relief bore 21, which is connected with a reservoir 22 for the pressure fluid. The actuator 15 is depicted as a pressure-fluid-actuated actuator, which has an electric motor 19 that actuates the master cylinder piston through a mechanism, so that the torque transmission system can be engaged and disengaged by means of the pressure-fluid conduit 17 and the slave cylinder 18. The actuator 15 can also be actuated with just an electric motor or just with hydraulics.

Actuator 15 includes a control unit 15a having control electronics a computer unit for controlling or regulating actuation of the clutch and/or a transmission by means of an actuator. The power electronics and/or the control electronics can be arranged within the actuator housing. However, those elements can also be provided within separate housings.

Actuation of a transmission or, for example, of a brake by means of such an actuator is not explicitly shown in FIG. 1, but it can also be performed with such an actuator. That would mean that at least one additional actuator of the kind of actuator 15 should be incorporated.

The motor vehicle 1 with the transmission 4 includes a gearshift lever 30. A gear recognition sensor 31 and/or a shift intention sensor 32 is arranged on the gear shift lever, or on the transmission, and it detects manual actuation of the gear shift lever and thus recognizes a shift intention of the driver based on the movement of the shift lever and/or based on the applied force. Furthermore, the vehicle is equipped with a rotational speed sensor 33, which detects the rotational speed of the transmission output shaft or of the drive wheels, respectively. Furthermore, a throttle valve sensor 34 is incorporated, which detects the throttle valve position, as well as a rotational speed sensor 35, which detects the engine rotational speed.

The gear recognition sensor 31 directly or indirectly detects the position of the transmission internal shift elements or the gear selected in the transmission, so that by means of a signal from sensor 31 at least the selected gear is registered by the control unit. Furthermore, in the case of an analog sensor, the movement of the transmission internal shift elements can be detected, so that early recognition of the next selected gear can occur.

Figure 2:
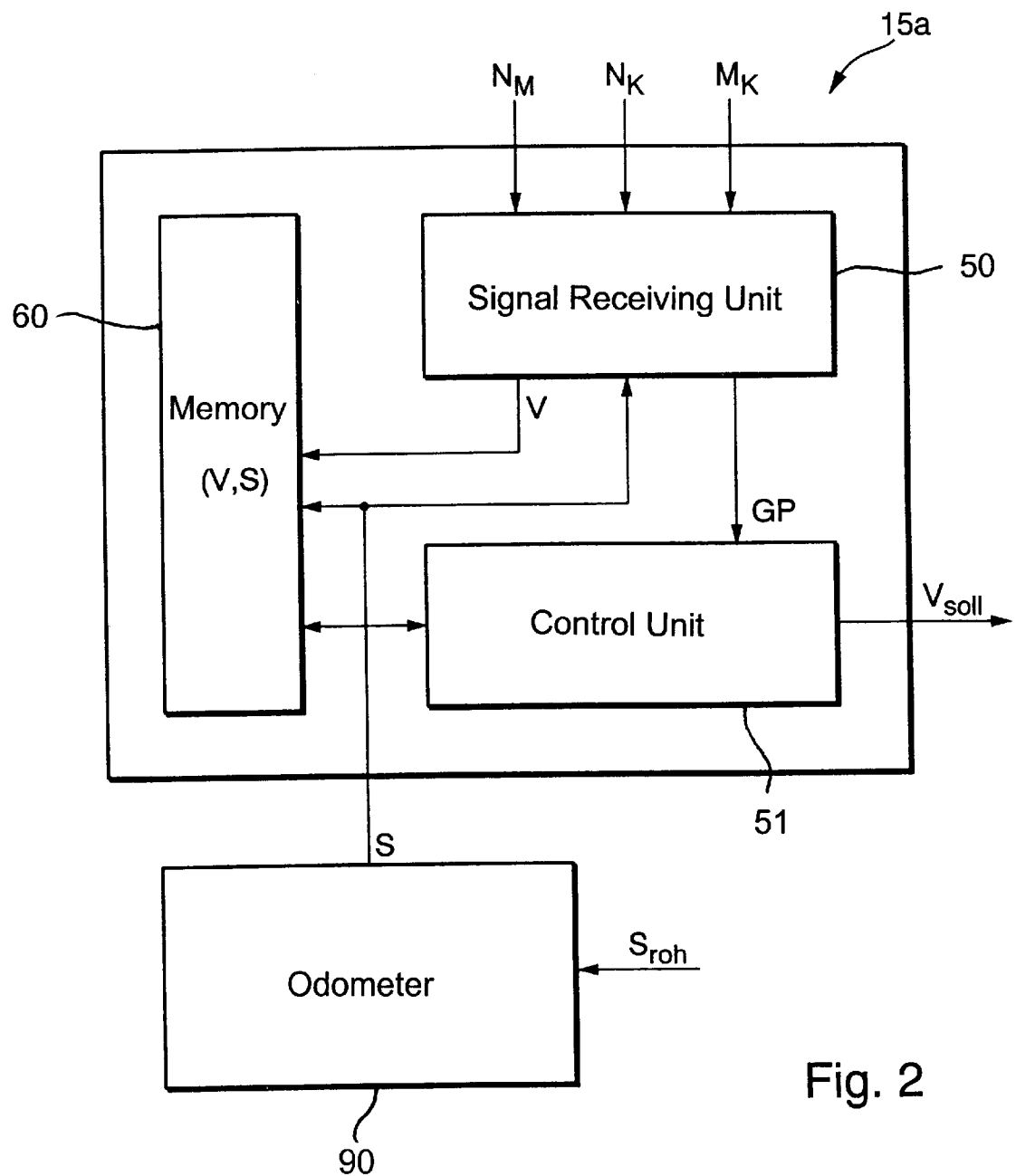
FIG. 2 is a block diagram of a motor vehicle control unit.

FIG. 2 shows a block connection diagram representing the inventive apparatus. In the control unit 15a a signal receiving unit 50 is provided, which receives the incoming signals from various sensors and/or other electronic units. Signal receiving unit 50 receives, for example, the signals of the rotational speed of the engine ($N_M$) and that of the transmission input shaft ($N_K$) or signals representing those values. In unit 50, for example, the performance loss V is determined based on the slippage os=engine rotational speed $N_M$–transmission input rotational speed $N_K$ and based on the torque $M_K$ transmitted by the clutch. With regard to this feature reference is made to German Patent Publication No. DE 196 02 006, the contents of which are expressly included as part of the disclosure content of the present application.

A sensor 90 for determining the distance traveled by the vehicle, such as a tachometer or odometer, transmits a signal S representative of the distance traveled to the unit 50 or to a memory 60. The memory receives the pair of performance loss and distance traveled values (V, S) and stores them. That storage process can be performed continuously for a specified time, or for a continuous specified distance S. The distance traveled S is determined, for example, through the addition or integration of an input value $S_{roh}$, such as wheel rotational speed or drive shaft rotational speed.

A control unit 51 can, for example, be utilized for the determination of the set point value $V_{soll}$ for actuation of a clutch, brake, or transmission, for example, for determining an adaptive value corresponding with the pair of values (V, S) stored in memory 60, and to calculate the current set point value $V_{soll}$.

Memory 60 can be a read-write memory, an EPROM, or an EEPROM, which are typically used in computer units.

The vehicle data, such as the distance traveled, the rotational speed, or other data, can also be transmitted, for example, through a data bus, such as a CAN-bus, by other electronic units, such as the motor control, an ABS control, or other units, to the control unit 15a.

The data in memory 60 are readable and further processable for testing and diagnostic purposes.

If, for example, the energy loss or the transmission loss is above a limit value due to slippage in the area of the clutch, a visual, or acoustic, or another form of signal can be generated, and can signal to the driver that a wear condition has been reached that makes a replacement or maintenance necessary in the future.

By means of the invention, it is useful in the case of motor vehicles to control an engine, an automated clutch, an automated clutch and/or an automated transmission, and/or an anti-lock system for brakes (ABS), and to utilize control units equipped with extensive sensors and operating data recording devices in order to determine the current operating data of the vehicle as comprehensively as possible. In that way the energy loss or transmission loss in the area of the clutch and/or in the area of a transmission, or other adaptive values or actuation values, can be recorded for a clutch or a transmission or their actuation devices.

Motor vehicles are generally equipped with engine controls, which record/detect among other things the torque produced by the engine as well as the rotational speed of the engine. In addition, a wheel rotational speed, or a signal representative of it, can be included, for example, to determine the driving speed and/or to control an anti-lock system of the vehicle's brakes. When these data are further transmitted to the control unit 15a, the slippage of the clutch can be determined.

For the torque transmittable by the clutch, such as the clutch torque, the pedal travel can be utilized, for example, wherein by means of a clutch characteristic curve, in which the clutch torque is given as a function of the pedal travel, the transmittable torque can be determined from the pedal travel.

In another embodiment of the invention the simplified assumption can be made that the engine torque is approximately equal to the torque transmittable by the clutch.

In the case of installation of the clutch between the engine and the transmission, with the clutch engaged the transmission input speed is directly linked with the engine rotational speed, whereby when the clutch slips the transmission input speed can possibly deviate slightly from the engine rotational speed.

The transmission output shaft speed or the drive wheel speed is numerically dependent upon the transmission input speed through the gear ratio, so that based on information about the gear ratios or the transmission output shaft speed, the transmission input speed can be determined. The clutch slippage can thus be calculated from the related data.

In this connection reference is again made to German Patent Publication No. DE 196 02 006.

By calculating the energy loss based on the slippage in the area of the clutch linings and/or by calculating the power loss, the wear of the friction linings of the clutch can be determined through a characteristic curve, in which the power loss and the wear of the friction linings in millimeters are plotted. When the wear of the friction linings of the clutch reaches the extent of the wear reserve of new clutch linings, the driver of the vehicle can be alerted to the wear situation with a warning signal.

It can also prove beneficial, however, to store other adaptive parameters, such as the engagement point of the clutch, as a function of the distance traveled by the vehicle.

When in a repair shop or during another opportunity for vehicle diagnosis, the time-related development or the development of adaptive parameters with regard to the distance can be evaluated.

This allows conclusions for relevant vehicle characteristics so that timely measures can be initiated.

The patent claims submitted with the application are formulation suggestions without prejudice for obtaining further patent protection. The applicant reserves the right to claim additional features that have so far been disclosed only in the description and/or drawings.

Based on the stored data, the wear of the clutch or of other components can also be calculated and from it the resulting current engagement point of the clutch can be determined. The engagement point GP is the actuation path of the clutch at which the clutch begins to transmit torque.

References made in the sub-claims to previously mentioned features point out further developments of the object of the main claim through features of the respective subclaim; they should not be understood as a waiver for achieving independent protection of the object for the features of the referenced sub-claims.

The objects of these sub-claims however also form independent inventions, which have formulations that are independent from the objects of the previous claims.

The invention is also not limited to the embodiment(s) of the description. Within the framework of the invention numerous alterations and modifications are possible, especially such variations, elements and combinations and/or materials that represent an invention, for example by combining or altering individual features and/or elements or procedures that are described in connection with the general description and the embodiments as well as in the claims and that are contained in the drawings and that lead to a new object or new procedures and/or procedural sequences through features that can be combined, including to the extent that they relate to manufacturing, testing and operational procedures.

What is claimed is:

1. A motor vehicle including a control unit for determining the energy loss resulting from clutch slippage, said vehicle comprising: a memory associated with the control unit for storing vehicle operating data, means for determining the distance traveled by the vehicle, whereby the vehicle operating data are associated with the distance traveled by the vehicle and are stored as paired values in the memory, means for determining clutch slippage energy loss based upon engine rotational speed, transmission input rotational speed, and torque transmitted by the clutch, and means for determining a set point value for actuation of one of a clutch, a brake, and a transmission based upon the stored paired values.

2. A motor vehicle in accordance with claim 1, wherein the vehicle includes at least one drive means and a clutch operatively connected with the drive means.

3. A motor vehicle in accordance with claim 2, wherein the clutch is actuated automatically.

4. A motor vehicle in accordance with claim 2, including a transmission that is actuated automatically.

5. A motor vehicle in accordance with claim 2, wherein the clutch is actuated manually.

6. A motor vehicle in accordance with claim 2, including a transmission that is actuated manually.

7. A motor vehicle in accordance with claim 1, wherein performance loss of the clutch is determined by integration of the product of transmittable clutch torque and a value representative of clutch slippage.

8. A motor vehicle in accordance with claim 7, including a device for determining engine rotational speed.

9. A motor vehicle in accordance with claim 7, including a device for determining transmission input speed.

10. A motor vehicle in accordance with claim 7, including a device for determining the torque transmittable by the clutch.

11. A motor vehicle having a drive train for delivering power to at least one drive wheel from an engine through a clutch, said vehicle comprising:

a. a signal receiving unit for receiving signals representative of engine rotational speed, transmission input rotational speed, and torque transmitted by the clutch for determining clutch performance loss values;

b. a distance determining device for providing a signal representative of distance traveled by the vehicle;

c. means for determining clutch slippage energy loss based upon engine rotational speed, transmission input rotational speed, and torque transmitted by the clutch; and d. a memory for storing respective energy loss values and vehicle distance traveled values as data pairs for subsequent diagnostic and maintenance purposes.

12. A motor vehicle in accordance with claim 11, including a signaling device for providing a signal when the performance loss value exceeds a predetermined value.

13. A motor vehicle in accordance with claim 12, wherein the signaling device provides a visual signal.

14. A motor vehicle in accordance with claim 12, wherein the signaling device provides an acoustic signal.

* * * * *